Feb. 26, 1963    H. H. DREISSEN    3,079,283
MANUFACTURING STARCH AND BY-PRODUCTS FROM
POTATOES, CASSAVA ROOTS, AND THE LIKE
Filed Feb. 16, 1961
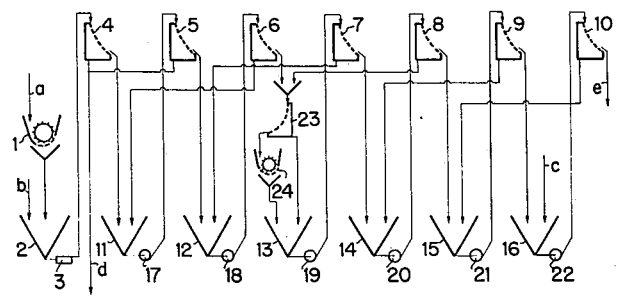
INVENTOR
HUBERT H. DREISSEN
BY Cushman, Darby & Cushman
ATTORNEYS 3,079,283
MANUFACTURING STARCH AND BY-PRODUCTS
FROM POTATOES, CASSAVA ROOTS, AND THE
LIKE
Hubert H. Dreissen, Geleen, Netherlands, assignor to
 Stamicarbon N.V., Heerlen, Netherlands
Filed Feb. 16, 1961, Ser. No. 89,704
Claims priority, application Netherlands Feb. 25, 1960
8 Claims. (Cl. 127—67)

The present invention relates to a process for manufacturing starch, and by-products from potatoes, cassava roots, and the like. In the process according to this invention, the raw mtaerials are ground or grated, and the resulting pulp is separated by screening into a fine fraction and a coarse fraction; the coarse fraction is re-ground or re-grated and the pulp resulting from this grinding or grating process is subsequently separated by screening into a fraction containing substantially the starch granules and a fraction containing substantially the fibres.

Related prior art processes are set forth in Parow, "Handbuch der Stärkefabrikation," 1928, page 329, and in "Das Bogensieb und seine Anwendung in der Stärkeindustrie," Die Stärke, 10 (1958), No. 11, pages 277–284. The latter publication describes a process for preparing potato-starch, in which a coarse screening of the grated pulp is effected in a first screening station by means of centrifugal screens, and a fine screening is subsequently carried out in a second screening station on so-called sieve-bends. A detailed description of the sieve-bend is set forth in the U.S. patent to Fontein, No. 2,916,142, and this disclosure is incorporated herein by reference.

It is customary to treat the pulp in both screening stations in a number of stages, which are each fed by a separate pump. An objection to this process is that both the starch fraction and the fibrous fraction are transported by a large number of pumps, as a result of which an appreciable percentage of the coarse fibres are broken. Part of these fine fibres enters the screened starch milk; and, consequently, has to be removed again in purifying installations consisting generally of hydrocyclones or centrifuges. As the fine fibres discharged with the waste water still contain fine starch granules, the waste water is usually led to settling tanks, in order to prevent loss of this starch, the waste water being re-treated in a secondary process.

An object of the present invention is to appreciably limit the number of screening stages and pumps to be passed through by the products. According to the present invention, this is achieved by combining the two screening stations.

Another object of this invention is to provide a process for preparing starch from raw materials wherein a very large portion of the fibres is already separated off in the initial part of the process, the amount of fibres immediately separated off being consequently greater than possible in the prior art. This process has as an advantage that also the production of cattle-fodder for which these fibres are the basic material, can also be increased.

Still another object of this invention is to provide screening stations of sieve bends having a slot width of 100–175μ. As will be apparent from the Fontein Patent No. 2,916,142, "slot width" denotes the size of the openings in the screening deck measured in the direction perpendicular to the generatrix of the screening deck.

Another object of this invention is to separate the fibre parts containing non-extracted starch granules from the overflow fraction of the final stage of the first screening part by means of a sieve bend having a greater slot width than the sieve bends of the first and second screening parts. However, to achieve a proper operation of this sieve bend, this overflow fraction has to be diluted. To this end, use is preferably made of the underflow fraction from the second stage of the second screening part.

These and other objects of the present invention will become more apparent during the course of the detailed description and appended claims.

The invention may best be understood with reference to the accompanying drawing wherein:

FIGURE 1 is a diagrammatic view of the process according to the present invention.

According to the process of the present invention, the total amount of the pulp resulting from the first grinding or grating process is immediately treated in the first screening part, the stages of which are formed by sieve bends of such a slot width that substantially only those parts are separated off whose maximum dimensions are of the order of magnitude of those of the largest starch granule. In the second screening process, the treatment is carried out in countercurrent with an amount of wash water supplied to the final stage thereof; at least part of the overflow fraction from the final stage of the first screening part is subsequently subjected to the second grinding or grating process, and the resulting pulp is treated further in the second screening part. By preference said overflow fraction from the first screening part is, prior to the said second grinding or grating process, separated into a coarse fraction, containing substantially the starch granular not yet extracted and a fine fraction which is supplied to the first stage of the second screening part, the coarse fraction being subjected to the second grinding or grating process.

Reference is now made to the accompanying drawing, wherein the washed potatoes, together with a small amount of water, are supplied at $a$ to the greater 1, in which they are so finely grated that as many starch granules as possible are released from the cells. The pulp thus obtained from the greater 1 is led to the receptacle 2, to which also a small portion of the wash water needed in the screening station is supplied at $b$.

For example, ⅕–⅓ of the required wash water may be supplied to the receptacle 2.

The formation of froth in the receptacle 2 is reduced, as will be apparent. The contents of the receptacle 2 are pumped to the screening station by the pump 3, which is preferably a positive displacement or a monopump, in view of the presence of froth. The froth present in the receptacle 2 necessitates overdimensioning of the pumps. However, as shown in the accompanying drawing, as a small part of the wash water is supplied at $b$, smaller pumps suffice than if the total amount of wash water is supplied to the final stage of the screening station. Consequently, the energy consumption of the screening station is decreased accordingly.

The screening station comprises seven stages, each consisting of one of the sieve bends 4 to 10, a pump cistern 11 to 16 and a pump 17 to 22, respectively. With a given amount of wash water the number of stages depends on the density (expressed in degrees Baumé) which the starch milk leaving the screening station should have.

The fibres are passed over the sieve bends in countercurrent with the wash water $c$ supplied to the cistern 16 of the last stage. In other words, the overflow fraction of each sieve bend, except the last, is supplied to the next sieve bend, and the underflow fraction of each sieve bend, except the first, is supplied to the proceeding sieve bend. However, as shown in the accompanying drawing, the underflow fraction of sieve bend 5 (the second stage of the first screening station) is added to the underflow fraction of the first stage thereof, in order to lower its density.

This is not necessary, however, as will be apparent. The undersize fraction of this second stage 5 may also be used in whole or in part as a diluting liquid for the grated pulp in the receptacle 2.

The sieve bends 4 to 10 all have a slot width of 100–175μ, the sieve bends 4 to 10 effecting a separation into an overflow fraction, the solid material in which consists predominantly of fibre parts having larger dimensions than the largest starch granules; and an underflow fraction, the solid material in which consists predominantly of starch granules and very fine fibre parts.

As the potatoes have been grated only once, the pulp supplied to the first screening part still contains non-extracted starch granules. In order to release these starch granules, the overflow fraction of the sieve bend 6 (the final stage of the first screening part) after being diluted with the underflow fraction of the sieve bend 8, is fed to a sieve bend 23, which has a larger slot width than the sieve bends 4 to 10, so that the cell parts still containing bound starch predominantly enter into the coarse fraction, while the fine fibre parts and the free starch granules are found in the fine fraction. Subsequently, the coarse fraction of the sieve bend 23 is regrated in the grater 24 and then, together with the fine fraction of the sieve bend 23, led back into the countercurrent system via the pump cistern 13 and the pump 19 which feeds the sieve bend 7 (the first stage of the second screening part).

As the overflow fraction of the sieve bend 6 is first screened on the large meshed sieve bend 23, practically no free starch granules and fine fibres are passed through the grater 24. Consequently, these fine fibre parts are not unnecessarily reduced in size and will thus remain in the overflow fractions of the sieve bends 7 to 10. They leave the screening station in the fibre fraction, which is discharged at e and is processed to cattle fodder.

As shown in the drawing, the overflow fraction of sieve bend 6 is treated on the sieve bend 23 and in the grater 24. It is also possible, however, to pass the overflow fraction of one of the other sieve bends across the sieve bend 23 and then through the grater 24. Generally, the position of these devices in the system should be so chosen that the free starch content of the product from the grater 24 substantially equals that of the undersize fraction of the sieve bend 23, with a view to preventing undesired discountinuities in the free starch content of the stream of starch milk, in the screening station.

The starch suspension freed of most of the fibres leaves the screening station at d and is successively concentrated and washed in countercurrent by known methods in hydrocyclones, centrifuges, or the like.

It will, therefore, be seen that there has been provided by this invention a method of manufacturing starch in which the various objects hereinbefore set forth, together with many practical advantages, are successfully achieved.

As various possible embodiments may be made of the features of this invention, all without departing from the scope thereof, it is to be understood that all matters herein set forth or shown in the accompanying drawing is to be interpreted in an illustrative, and not in a limiting sense.

I claim:

1. Process for manufacturing starch and by-products from potatoes, cassava roots, and the like, comprising the steps of: grating the raw materials to form a pulp; separating the pulp into an undersize starch fraction and an oversize fibre fraction in a screening station having first and second screening parts which include successive screening stages, each of the screening stages being formed by sieve bends having slot widths of such dimensions that a separation is effected of those parts whose maximum dimensions are the order of magnitude of those of the largest starch granules; screening the pulp in the first screening part; subjecting at least part of the said overflow fraction to a second grating operation; screening the grated coarse fraction and the fine fraction in the second screening part; and supplying a counter-current of wash water to the final stage of the second screening part.

2. Process according to claim 1, wherein prior to subjecting the overflow fraction from the first screening part to said second grating operation, said overflow fraction is separated into a coarse fraction and a fine fraction, said coarse fraction being subjected to the said second grating operations.

3. Process according to claim 1 wherein the sieve bends have a slot width of 100–175μ.

4. Process according to claim 2, wherein the separation of the overflow fraction from the final stage of the first screening part into a coarse fraction and a fine fraction is carried out after dilution, with a sieve bend having a greater slot width than the sieve bends of the screening stages.

5. Process according to claim 4, wherein the overflow fraction of the first screening part is diluted with the underflow fraction from the second stage of the second screening part.

6. Process according to claim 5 wherein the re-grated coarse fraction obtained from the overflow fraction of the first screening part has a free starch content which is substantially equal to that of the fine fraction in the underflow fraction from the second stage of the second screening part.

7. Process according to claim 1 wherein a portion of the required amount of wash water is supplied to the first stage of the first screening part.

8. Process according to claim 7, wherein the underflow fraction from the second stage of the first screening part is added, at least in part, to the underflow fraction from the first stage of the first screening part.

References Cited in the file of this patent

UNITED STATES PATENTS

| | | |
|---|---|---|
| 2,798,011 | Fontein | July 2, 1957 |
| 2,916,142 | Fontein | Dec. 8, 1959 |
| 2,974,068 | Fontein | Mar. 7, 1961 |